United States Patent [19]
Watt

[11] Patent Number: 4,902,162
[45] Date of Patent: Feb. 20, 1990

[54] SHAFT AND ROTATABLE MACHINE ELEMENT ASSEMBLY

[75] Inventor: James M. Watt, Montgomery County, Pa.

[73] Assignee: Emerson Electric Co., St. Louis, Mo.

[21] Appl. No.: 183,657

[22] Filed: Apr. 19, 1988

[51] Int. Cl.⁴ ............................................... F16D 1/06
[52] U.S. Cl. .................................... 403/355; 403/318; 403/354
[58] Field of Search ............... 403/355, 356, 318, 319, 403/316, 315, 378, 379, 261, 375, 354, 360, 257; 74/439, 606 R; 474/903

[56] References Cited

U.S. PATENT DOCUMENTS

| | | | |
|---|---|---|---|
| 872,883 | 12/1907 | Adams | 403/261 |
| 2,269,429 | 1/1942 | Brenkert | 403/355 |
| 2,793,484 | 5/1957 | McNeill et al. | 403/355 X |
| 3,062,569 | 11/1962 | Westermeier | 403/354 |
| 3,115,355 | 12/1963 | Gardner | 403/318 |
| 3,203,268 | 8/1965 | Manoni et al. | 403/375 X |
| 3,222,772 | 12/1965 | Leyner | 403/354 X |
| 4,112,786 | 9/1978 | Thomas | 74/606 R |
| 4,353,685 | 10/1982 | Osborn et al. | 403/261 X |
| 4,373,831 | 2/1983 | Crawford | 403/318 |

FOREIGN PATENT DOCUMENTS 2611882 9/1977 Fed. Rep. of Germany ...... 403/355

*Primary Examiner*—Randolph A. Reese
*Assistant Examiner*—Peter M. Cuomo
*Attorney, Agent, or Firm*—Polster, Polster and Lucchesi

[57] ABSTRACT

An improved structure for assembling a gear to a shaft to be rotatably mounted in a housing including a rotatable shaft with a projection member radially extending therefrom and with the hub of a gear slidably mounted on the shaft so that one face of the hub of the gear is adjacent to and opposed to one side of the projection member and a fastening member cooperable with such hub face and opposed side of the projection member to restrain rotational movement of the gear relative the shaft.

14 Claims, 3 Drawing Sheets

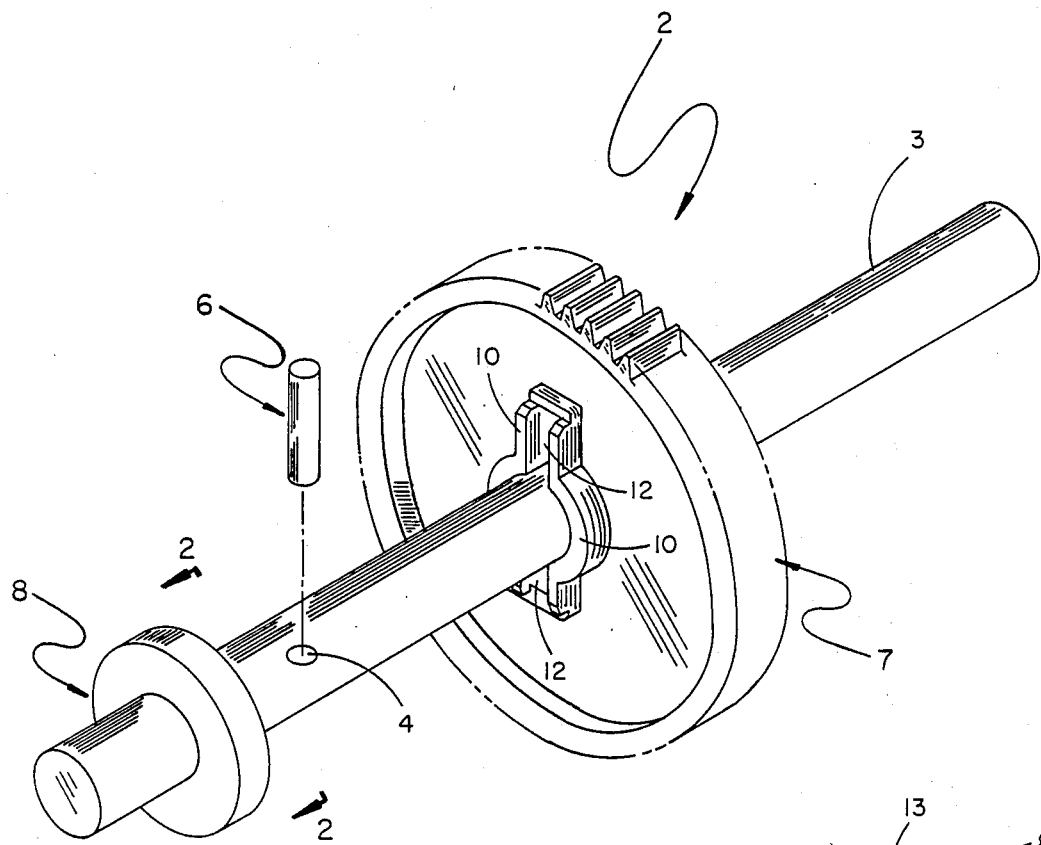
FIG. 1
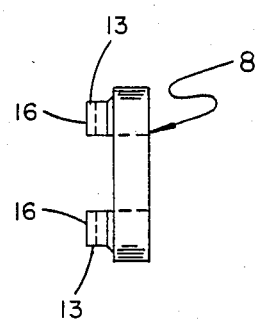
FIG. 4
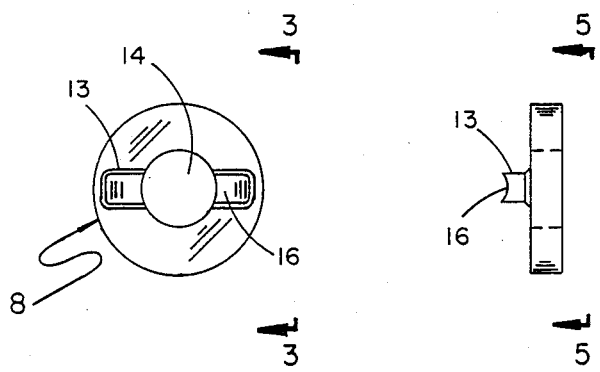
FIG. 2
FIG. 3
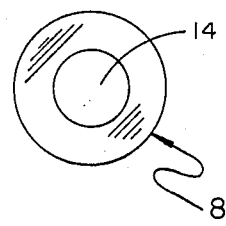
FIG. 5

SHAFT AND ROTATABLE MACHINE ELEMENT ASSEMBLY

BACKGROUND OF THE INVENTION

The present invention relates to a shaft and rotatable machine element assembly and more particularly to a unique structural arrangement for a shaft and gear assembly wherein the hub of a gear is slidably mountable upon a rotatable shaft having a radially extending projection member, the hub being restrained from rotational movement on the shaft through a fastening arrangement cooperable between the hub and projection member.

It has been long known in the machine design art to fasten a gear (or other rotatable machine element such as a disk or sheave); slidably mountable on a rotatable shaft by either passing a pin member through aligned apertures or lateral recesses in the hub of a gear and in the shaft on which the gear has been mounted or by threading a pin in the form of a set screw through an aperture in the shaft hub with the end of the pin or set screw engaging tightly against the peripheral wall of the shaft when the threaded set screw is rotated in a preselected direction. Both of these well known aforedescribed arrangements often require stress-inducing drilling in the gear hub or other complex steps to provide the aperture in the hub with load accommodating characteristics being limited by the relative geometry, location and manner of engagement between pin and hub. Further, the frictional engagement arrangement of the threaded pin or set screw end against the shaft surface has resulted in problems of rotational slippage. Moreover, in the arrangement where a pin extends through aligned apertures in the hub and shaft, accurate drilling and aligning steps have been required in manufacture and assembly, these steps being comparatively time-consuming and expensive.

Recognizing these problems of past arrangements, the unique structural arrangement of the present invention provides a shaft and gear assembly which is straightforward and economical in both manufacture and assembly, requiring a comparative minimum of steps in both operations. Further, the novel structural arrangement of the present invention minimizes past problems of aperture alignment between hub and shaft without sacrificing the ability of the assembly to accommodate both bi-directional axial and torsional loads and, in fact, serve to optimize the distribution and accommodating capacity for axial and torsional loads. In addition, the structural assembly arrangement of the present invention integrates a novel spacer structure into the assembly, allowing for compact axial adjustment of a preselected number of interlocking spacers in accordance with usage demands. Further, the structural features of the present invention can be effectively and efficiently employed with various configurations and sizes of gear and shaft arrangements, allowing for quick and efficient interchange of the several parts of the structural assembly.

Various other features of the present invention will become obvious to one skilled in the art upon reading the disclosure set forth herein.

BRIEF SUMMARY OF THE INVENTION

More particularly, the present invention provides an improved structure for assembling a rotatable machine element member to a shaft to be rotatably mounted therewith comprising: a rotatable shaft; a projection member arranged to extend radially from the periphery of the shaft; arotatable machine element including a fixed hub portion slidably mounted on the shaft so that one face of the hub portion can be positioned adjacent one side of the projection member extending radially from the shaft; and interlocking fastening means cooperable with at least one side of the projection member and the adjacent face of the hub portion to assemble the shaft and machine element, restraining rotational movement of the machine element relative the shaft. Further, the present invention provides a unique structure which permits transmission of both torsional and axial loads in a shaft and machine element assembly midway between the width of the machine element hub to optimize the transmission of such loads. In addition, the present invention provides a novel arrangement for rotatably mounting such shaft and machine element on and between restraining means cooperable with a housing and the present invention also provides a novel interlocking spacer assembly which can be effectively utilized in a compact spacer assembly adaptable to varying width requirements in the overall machine element and spacer assembly arrangement.

It is to be understood that various changes can be made by one skilled in the art in one or more of the several parts of the apparatus disclosed herein without departing from the scope or spirit of the invention.

BRIEF DESCRIPTION OF THE DRAWINGS

Referring to the drawings which disclose one advantageous embodiment of the invention and a variation thereof:

FIG. 1 is an exploded isometric view of a rotatable shaft with gear, pin and spacer mounted thereon in accordance with one advantageous embodiment of the present invention;

FIG. 2 is an end elevational view of the spacer of FIG. 1 taken in a plane through line 2—2 of FIG. 1;

FIG. 3 is a side view of the spacer of FIG. 2 taken in a plane through line 3—3 of FIG. 2;

FIG. 4 is a side view of the spacer of FIG. 3 rotated 90 degrees;

FIG. 5 is a rear view of the spacer of FIG. 4 taken in a plane through line 5—5 of FIG. 3;

DETAILED DESCRIPTION OF THE DRAWINGS

As can be seen in FIG. 1 of the drawings, the inventive assembly 2 includes a rotatable shaft 3. Shaft 3 which can be a typical steel shaft or which can be made from some other suitable rigid material is provided with an aperture 4 extending radially therethrough to receive cylindrical pin 6 of greater length than the diameter of shaft 3 to provide a pair of shaft protruding pin sections which serve as projection members arranged to extend radially from the periphery of rotatable shaft 3. Advantageously, pin 6 is sized in diameter to be press fit through aperture 4 in shaft 3. It is to be understood that it also would be possible to have pin 6 slidably engage in aperture 4, the pin being restrained from axial movement by the nesting gear and interlocking spacer assembly described herein. Further, it is to be understood that the present invention is not to be considered as limited to the cylindrical pin configuration shown but that other radial projection member configurations also could be utilized.

Figure 6:
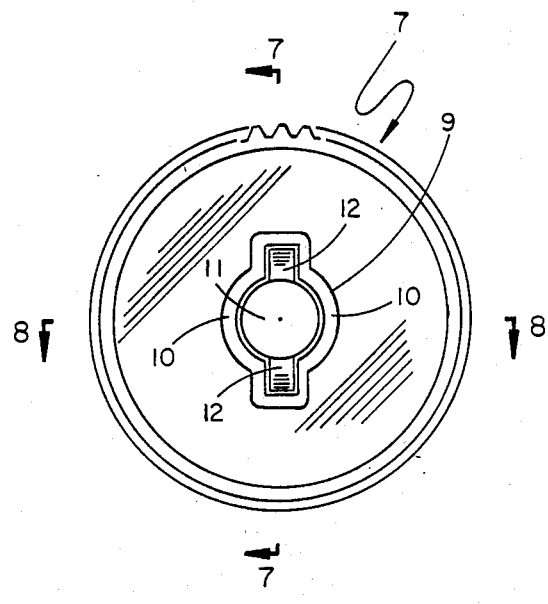
FIG. 6 is an end elevational view of the inventive gear structure of FIG. 1.
Figure 7:
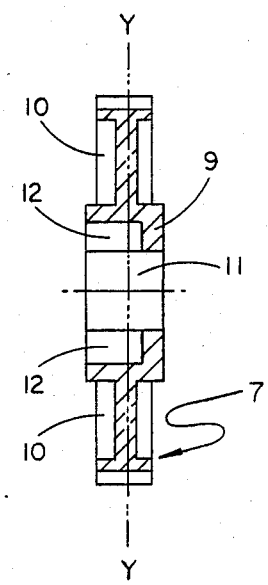
FIG. 7 is a cross-sectional side view of the gear of FIG. 6 taken in a plane through line 7—7 of FIG. 6.
Figure 8:
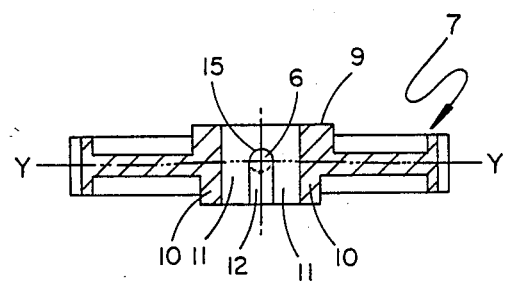
FIG. 8 is a cross-sectional plan view of the gear of FIG. 6 taken in a plane through line 8—8 of FIG. 6.
Figure 9:
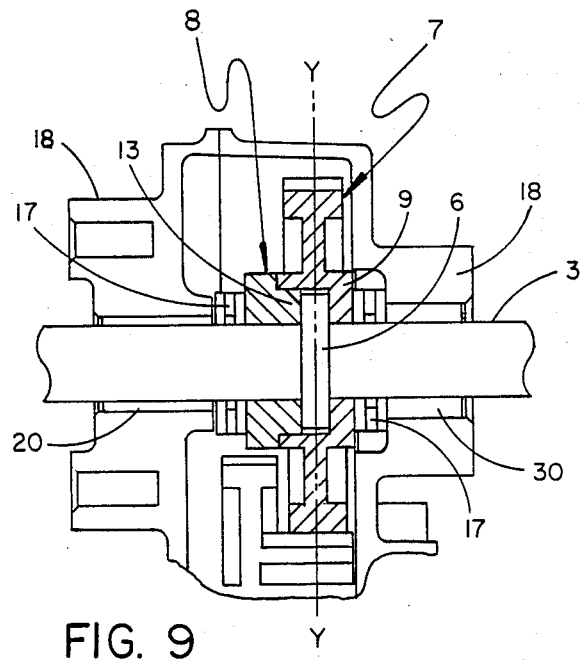
FIG. 9 is a partial cross-sectional elevational view of the inventive shaft, gear, spacer and bearing assembly disposed in part of a typical gear housing.

As can also be seen in FIG. 1, slidably mounted on shaft 3 on either side of the projection member in facing relation is a gear 7 and interlocking spacer 8. Referring particularly to FIGS. 6-8, gear 7, which can be formed from any one of a number of suitable tough, strong materials such as plastic or compacted powdered metals, is provided with a hub portion 9 joined to the gear ring by a web member. Hub 9 has a suitably sized aperture 11 therein to permit slidable mounting of gear 7 on shaft 3. Extending radially from either side of aperture 11 in hub 9 are laterally open-ended recesses 12 terminating within hub 9 in curved surfaces 15 and surrounded in part by spaced longitudinal protrusions or flanks 10 extending from the web face of gear 7. As can be seen in FIGS. 8 and 9 of the drawings, open-ended recesses 12 are contoured as at 15, dimensioned and sized in hub 9 to nest in curvilinear facing contact with only one corresponding pair of curved side faces of the radially protruding cylindrical pin sections of cylindrical pin 6 which extends through shaft 3 so that the longitudinal rotating axis of pin 6, when the curved side faces of the pin sections are so nested in contacting relation with the curved surfaces 15 of recesses 12, falls in a plane Y-Y extending normal to the rotational axis of hub 9 halfway between the extremities of the hub width. This engagement of the curved extremities 15 of recesses 12 of hub 9 with corresponding curved side faces of the cylindrical pin sections of pin 6 restrains rotational movement of gear 7 relative the shaft 3 with the contacting curved surfaces and location of contact substantially centrally within the hub width serving to optimize the distribution and accommodating capacity for axial and torsional loads.

Referring to FIGS. 1-5 of the drawings, it can be seen that slidably mountable on shaft 3 on the other side of the projection member or pin 6 is spacer 8 with pin 6 sandwiched between opposed faces of spacer 8 and gear 7. Spacer 8, like gear 7, also can be molded from a suitable, tough strong material such as plastic or compacted powdered metal to include a pair of rib-like protrusions 13 radially extending from one face thereof from an aperture 14 through which shaft 3 passes for slidable mounting thereon. Protrusions 13 have radially extending open-ended curved recesses 16. These protrusions 13 with curved recesses 16 are contoured and sized so that protrusions 13 of spacer 8 nest and interlock with the open-ended recesses 12 in hub 9 of gear 7 with the open-ended recesses at the opposite faces of gear 7 and protrusions 13 nesting with opposite corresponding pairs of the curved side faces of the pin sections of pin 6 extending from the shaft 3 to maximize surface contact so that pin 6, spacer 8 and gear 7 are in interlocking engagement with maximized surface contact between spacer and gear and optimized load distribution.

Referring to FIG. 9 which discloses this interlocking engagement of pin 6, the hub 9 of gear 7 and protrusions 13 of spacer 11, it can be seen that the inner races of a pair of spaced thrust bearings 17, on which shaft 3 is rotatably mounted, serve to restrain lateral movement of this interlocking assembly. It is to be understood that means other than the thrust bearings disclosed could be used to restrain lateral movement and take up axial thrust load. For example, suitable washers could be used between the sleeve bearings 20 and 30 in the housing and the inventive gear and fastening assembly. As will be noted in FIG. 9, the outer races of spaced bearings 17 abut the opposed spaced side walls of housing 18. Thus, the interlocking structural arrangement of spacer, gear and projection member can be manufactured and assembled in a straightforward economical manner with a minimum of assembly steps involved and with a minimum of alignment problems, the interlocking assembly being capable of readily handling in an optimum fashion both bi-directional axial loads and torsional loads with minimum slippage.

Figure 10:
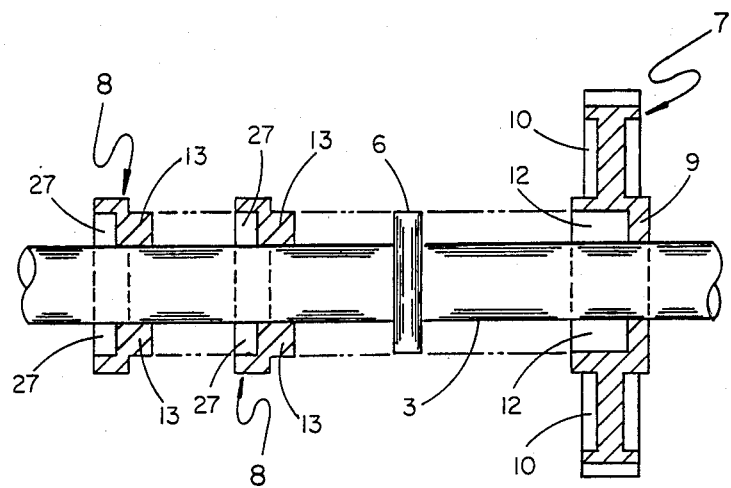
FIG. 10 is an exploded partial cross-sectional side view of a further embodiment of the gear, spacer, shaft and pin or radially projection arrangement of the present invention; and, FIG. 11 is an exploded partial cross-sectional plan view of the structure of FIG. 10.
Figure 11:
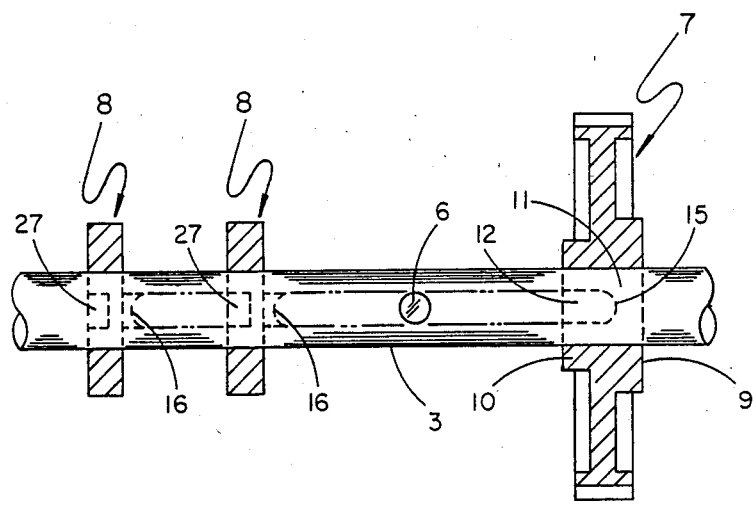

Referring to FIGS. 10 and 11, still a further embodiment of the inventive shaft and gear assembly can be seen wherein shaft 3 can be provided with more than one slidably mounted spacer. In this regard it is to be noted that the opposite face of each spacer 8 has a recessed opening 27 therein contoured and sized to nestingly receive the protrusions 13 of an adjacent spacer to thus permit interlocking usage of like spacers in accordance with spacing needs as might be dictated by the environment in which the inventive assembly is employed.

The invention claimed is:

1. An improved structure for assembling a rotatable machine element member to a shaft to be rotatably mounted comprising:

a rotatable shaft;

a projection member arranged to extend radially from the periphery of said rotatable shaft;

a rotatable machine element including a portion fixed thereto slidably mounted on said shaft with one side face of said portion having a recessed area therein so that said recessed area of said portion can be positioned in interfacing relation adjacent one side face of said projection member extending radially from said shaft; and interlocking fastening means including a nesting member part physically separate and initially independent from said projection member and said recessed area in said portion of said rotatable machine element, said fastening means being cooperable with the other side face of said projection member and said recessed area in said adjacent face of said portion of said machine element to assemble said shaft and machine element, restraining rotational movement of said machine element relative said shaft.

2. The structure of claim 1, said interlocking fastening means being cooperatively positioned with said machine element and projection member to transmit axial torsional loads along a plane midway through the width of said machine element portion.

3. The structure of claim 1, and restraining means positioned on opposite sides of said fastened portion of said rotatable machine element and said projection member on said shaft to restrain lateral movement of said rotatable shaft and machine element therebetween.

4. The improved structure of claim 1, and restraining means to restrain lateral movement of said rotatable shaft and machine element including a housing in which said shaft and machine element assembly are rotatably disposed; and a pair of spaced thrust bearing members on which said shaft is rotatably mounted with the inner races of said bearing members abutting said machine element assembly and the outer races of said bearing members abutting opposed spaced walls of said housing.

5. The improved structure of claim 1, said interlocking fastening means being an integral part of and extending from one face of a separate and initially independent spacer slidably mounted on said rotatable shaft on the other side of said projection member on said shaft with said face of said spacer including said nesting member part, said nesting member part being adjacent said projection member on said shaft and opposed to said face of said machine element portion to sandwich said projection member on said shaft between said adjacent face of said machine element portion and said adjacent nesting member part;

said recessed area and said nesting member part on opposed faces being contoured and sized to engage said projection member on said shaft on opposite sides thereof to restrain rotational movement of both said hub of said machine element and said spacer relative said shaft.

6. The improved structure of claim 1, said interlocking fastening means being an integral part of a separate and initially independent spacer slidably mounted on said rotatable shaft on the other side of said projection member on said shaft with one face of said spacer being adjacent said projection member on said shaft and opposed to said face of said machine element to sandwich said projection member on said shaft between said opposed faces;

at least one of said opposed machine element and spacer faces including a laterally extending protrusion integral therewith with its end extremity contoured and sized to embrace one side of said projection member and the opposite face having a recessed opening therein to embrace the other side of said projection member to restrain rotational movement of both said portion of said machine element and said space relative said shaft.

7. The improved structure of claim 1, said interlocking fastening means being an integral part of a separate and initially independent spacer slidably mounted on said rotatable shaft on the other side of said projection member on said shaft with one face of said spacer being adjacent said projection member on said shaft and opposed to said face of said machine element portion to sandwich said projection member on said shaft between said opposed faces;

at least one of said opposed machine element and spacer faces including a laterally extending protrusion integral therewith with its end extremity contoured and sized to embrace one side of said projection members and the opposite face having a recessed opening therein sized to receive said protrusion on said other face and embrace the other side of said projection member in interlocking relation to restrain rotational movement of both said machine element and said spacer relative said shaft.

8. The structure of claim 1, said interlocking fastening means being in the form of a radially extending open-ended recessed area on said adjacent face of said machine element portion contoured and sized to nest with one side of said projection member extending from said shaft; and, an interlocking spacer slidably mounted on said shaft, said spacer including said separate and initially independent nesting member part in the form of a protrusion integrally extending from one face thereof, said protrusion having a radially extending open-ended recess cooperatively positioned at the end extremity thereof, said protrusion extending from said spacer with said open-ended recess at the end extremity thereof being contoured and sized that said protrusion extending from said spacer nests with said open-ended recessed area of said portion of said machine element and said open-ended recess on the end extremity of said protrusion nests with the opposite side of said projection member extending from said shaft in interlocking engagement therewith.

9. The improved assembly of claim 1, said projection member extending radially from said shaft comprising a cylindrical pin member.

10. The improved assembly of claim 1, said projection member extending radially from said shaft comprising a cylindrical pin member press fit in an aperture in said shaft to extend therethrough providing radially extending pin sections on either side of said shaft.

11. The improved assembly of claim 1, said projection member extending radially from said shaft comprising a cylindrical pin member, said area of said hub portion being curvilinear to nestingly engage one side face of said pin and said interlocking fastening means being curvilinear to nestingly engage the opposite side face of said pin.

12. The improved assembly of claim 1, said projection member extending radially from said shaft comprising a cylindrical pin member, said recessed area of said machine element portion being the terminal portion of a lateral recess in said machine element portion and being curvilinear to nestingly engage one side face of said pin with the longitudinal axis of said pin lying within a plane midway along the width of said machine element portion and said nesting member part of said interlocking fastening means being curvilinear at the extremity thereof to nestingly engage the opposite side face of said pin.

13. The improved assembly of claim 1, said shaft having at least two spacers slidably mountable on said shaft, each of said spacers having a radially extending interlocking means including a nesting member part with one of such nesting members parts of one spacer being cooperatively positioned along one face thereof contoured and sized to cooperate with said other side of said projection member extending from said shaft and said recessed area of said machine element portion in the from of a gear hub portion, each spacer having a recessed area on the opposite face thereof contoured and sized to nestingly receive a separate nesting member part of an adjacent spacer to permit interlocking usage of spacers in accordance with spacing needs.

14. An improved structure for assembling a gear member to a shaft to be rotatably mounted in a housing comprising:

a rotatable shaft having an aperture extending radially therethrough with a cylindrical pin member press fit in said aperture to extend therethrough providing cylindrical pin sections extending radially from opposite sides of said shaft;

a plastic gear having a hub portion slidably mounted on said shaft, said hub portion having radially extending open-ended lateral recesses therein terminating in curvilinear surfaces sized and positioned to nest in facing contact with only one corresponding pair of side faces of said pin sections extending from said shaft with the longitudinal axes of said pin sections lying in a plane midway along the width of said hub portion to restrain rotational movement of said gear relative said shaft and maximize distribution of axial and torsional loads;

a plastic interlocking spacer mounted on said shaft, said spacer having a pair of rib-like protrusions radially extending from one face thereof, said rib-like protrusions having radially extending open-ended curvilinear recesses at the end faces thereof, said protrusions and said curvilinear open-ended recesses at the end faces thereof being contoured and sized so that said protrusions nest with said open-ended recesses in said hub portion of said gear and said curvilinear open-ended recesses at the end faces of said protrusions nest with the opposite corresponding pair of side faces of said pin sections extending from said shaft in interlocking engagement therewith; and a pair of thrust bearing members in which said shaft is rotatably mounted with the inner races thereof abutting said gear hub and said interlocking spacer on opposite sides thereof and the outer races thereof abutting opposed spaced walls of said housing.

* * * * *